US005986258A

United States Patent [19]

Park

[11] Patent Number: 5,986,258

[45] **Date of Patent: *Nov. 16, 1999**

[54] EXTENDED BRADBURY-NIELSON GATE

[75] Inventor: Melvin Park, Nashua, N.H.

[73] Assignee: Bruker Daltonics, Inc., Billerica, Mass.

[ * ] Notice: This patent is subject to a terminal disclaimer.

[21] Appl. No.: 08/911,639

[22] Filed: Aug. 15, 1997

Related U.S. Application Data

[63] Continuation of application No. 08/548,012, Oct. 25, 1995, abandoned.

[51] Int. Cl.[6] .............................. G01D 59/44; H01J 49/00

[52] U.S. Cl. .............................. 250/287; 250/294

[58] Field of Search .............................. 250/281, 287, 250/396 R, 397, 294

[56] References Cited

U.S. PATENT DOCUMENTS

| | | | |
|---|---|---|---|
| 4,777,363 | 10/1988 | Eiceman et al. | 250/287 |
| 5,032,722 | 7/1991 | Bosel et al. | 250/287 |
| 5,045,694 | 9/1991 | Beavis et al. | 250/287 |
| 5,117,107 | 5/1992 | Guilhaus et al. | 250/287 |
| 5,160,840 | 11/1992 | Vestal | 250/287 |
| 5,194,732 | 3/1993 | Bateman | 250/294 |
| 5,198,666 | 3/1993 | Bateman | 250/294 |
| 5,214,289 | 5/1993 | Betsui | 250/396 R |
| 5,304,797 | 4/1994 | Irie et al. | 250/287 |
| 5,696,375 | 12/1997 | Park | 250/287 |

*Primary Examiner*—Bruce C. Anderson
*Attorney, Agent, or Firm*—Ward & Olivo

[57] ABSTRACT

A method and apparatus for analyzing ions by determining times of flight include using a deflector to direct ions away from their otherwise intended or parallel course. Deflectors are used as gates, so that particular ions may be selected for deflection, while others are allowed to continue along their parallel or otherwise straight path, from the ion source, through a flight tube, and eventually, to a detector. According to the present invention, an extended Bradbury-Nielson gate, in the form of a series of plates, with equal but alternating opposite polarity potentials, is used as an ion deflector or gate.

17 Claims, 11 Drawing Sheets

FIG. 4A
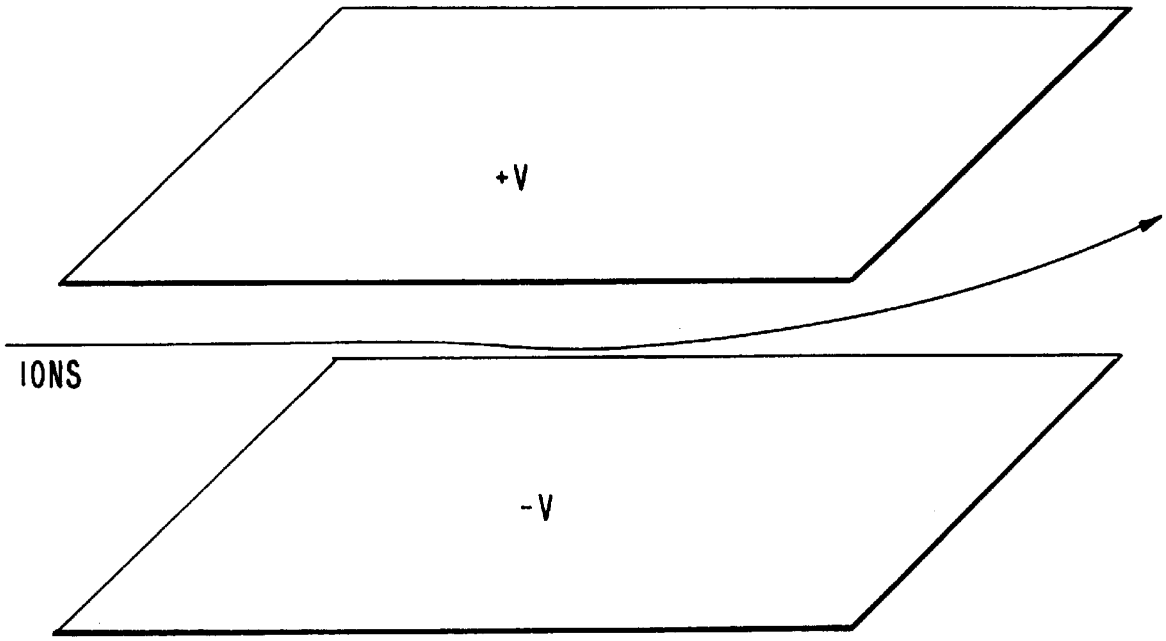
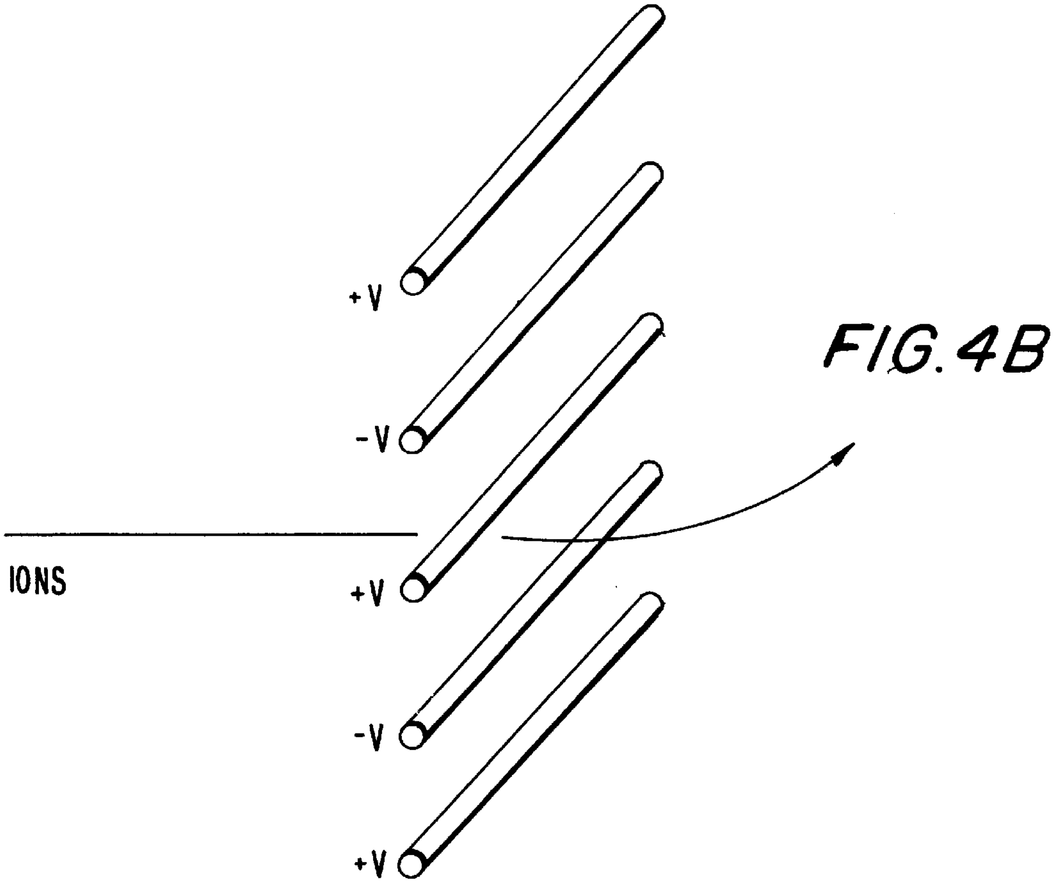
FIG. 4B

EXTENDED BRADBURY-NIELSON GATE

This is a continuation, of application Ser. No. 08/548,012, filed Oct. 25, 1995, now abandoned.

TECHNICAL FIELD

This invention relates generally to ion beam handling and more particularly to a gate for use in time-of-flight mass spectrometry.

BACKGROUND ART

This invention relates in general to ion beam handling in mass spectrometers and more particularly to ion gating in time-of-flight mass spectrometers (TOFMS). The apparatus and method of mass analysis described herein is an enhancement of the techniques that are referred to in the literature relating to mass spectrometry.

The analysis of ions by mass spectrometers is important, as mass spectrometers are instruments that are used to determine the chemical structures of molecules. In these instruments, molecules become positively or negatively charged in an ionization source and the masses of the resultant ions are determined in vacuum by a mass analyzer that measures their mass/charge (m/z) ratio. Mass analyzers come in a variety of types, including magnetic field (B), combined (double-focusing) electrical (E) and magnetic field (B), quadrupole (Q), ion cyclotron resonance (ICR), quadrupole ion storage trap, and time-of-flight (TOF) mass analyzers, which are of particular importance with respect to the invention disclosed herein. Each mass spectrometric method has a unique set of attributes. Thus, TOFMS is one mass spectrometric method that arose out of the evolution of the larger field of mass spectrometry.

The analysis of ions by TOFMS is, as the name suggests, based on the measurement of the flight times of ions from an initial position to a final position. Ions which have the same initial kinetic energy but different masses will separate when allowed to drift through a field free region.

Ions are conventionally extracted from an ion source in small packets. The ions acquire different velocities according to the mass-to-charge ratio of the ions. Lighter ions will arrive at a detector prior to high mass ions. Determining the time-of-flight of the ions across a propagation path permits the determination of the masses of different ions. The propagation path may be circular or helical, as in cyclotron resonance spectrometry, but typically linear propagation paths are used for TOFMS applications.

TOFMS is used to form a mass spectrum for ions contained in a sample of interest. Conventionally, the sample is divided into packets of ions that are launched along the propagation path using a pulse-and-wait approach. In releasing packets, one concern is that the lighter and faster ions of a trailing packet will pass the heavier and slower ions of a preceding packet. Using the traditional pulse-and-wait approach, the release of an ion packet as timed to ensure that the ions of a preceding packet reach the detector before any overlap can occur. Thus, the periods between packets is relatively long. If ions are being generated continuously, only a small percentage of the ions undergo detection. A significant amount of sample material is thereby wasted. The loss in efficiency and sensitivity can be reduced by storing ions that are generated between the launching of individual packets, but the storage approach carries some disadvantages.

Resolution is an important consideration in the design and operation of a mass spectrometer for ion analysis. The traditional pulse-and-wait approach in releasing packets of ions enables resolution of ions of different masses by separating the ions into discernible groups. However, other factors are also involved in determining the resolution of a mass spectrometry system. "Space resolution" is the ability of the system to resolve ions of different masses despite an initial spatial position distribution within an ion source from which the packets are extracted. Differences in starting position will affect the time required for traversing a propagation path. "Energy resolution" is the ability of the system to resolve ions of different mass despite an initial velocity distribution. Different starting velocities will affect the time required for traversing the propagation path.

In addition, two or more mass analyzers may be combined in a single instrument to form a tandem mass spectrometer (MS/MS, MS/MS/MS, etc.). The most common MS/MS instruments are four sector instruments (EBEB or BEEB), triple quadrupoles (QQQ), and hybrid instruments (EBQQ or BEQQ). The mass/charge ratio measured for a molecular ion is used to determine the molecular weight of a compound. In addition, molecular ions may dissociate at specific chemical bonds to form fragment ions. Mass/charge ratios of these fragment ions are used to elucidate the chemical structure of the molecule. Tandem mass spectrometers have a particular advantage for structural analysis in that the first mass analyzer (MS1) can be used to measure and select molecular ion from a mixture of molecules, while the second mass analyzer (MS2) can be used to record the structural fragments. In tandem instruments, a means is provided to induce fragmentation in the region between the two mass analyzers. The most common method employs a collision chamber filled with an inert gas, and is known as collision induced dissociation CID. Such collisions can be carried out at high (5–10 keV) or low (10–100 eV) kinetic energies, or may involve specific chemical (ion-molecule) reactions. Fragmentation may also be induced using laser beams (photodissociation), electron beams (electron induced dissociation), or through collisions with surfaces (surface induced dissociation). It is possible to perform such an analysis using a variety of types of mass analyzers including TOF mass analysis.

In a TOFMS instrument, molecular and fragment ions formed in the source are accelerated to a kinetic energy:

$$eV = \frac{1}{2}mv^2 \qquad (1)$$

where e is the elemental charge, V is the potential across the source/accelerating region, m is the ion mass, and v is the ion velocity. These ions pass through a field-free drift region of length L with velocities given by equation 1. The time required for a particular ion to traverse the drift region is directly proportional to the square root of the mass/charge ratio:

$$t = L\sqrt{\frac{m}{2eV}} \qquad (2)$$

Conversely, the mass/charge ratios of ions can be determined from their flight times according to the equation:

$$\frac{m}{e} = at^2 + b \qquad (3)$$

where a and b are constants which can be determined experimentally from the flight times of two or more ions of known mass/charge ratios.

Generally, TOF mass spectrometers have limited mass resolution. This arises because there may be uncertainties in the time that the ions were formed (time distribution), in their location in the accelerating field at the time they were formed (spatial distribution), and in their initial kinetic energy distributions prior to acceleration (energy distribution).

The first commercially successful TOFMS was based on an instrument described by Wiley and McLaren in 1955 (Wiley, W. C.; McLaren, I. H., Rev. Sci. Instrumen. 26 1150 (1955)). That instrument utilized electron impact (EI) ionization (which is limited to volatile samples) and a method for spatial and energy focusing known as time-lag focusing. In brief, molecules are first ionized by a pulsed (1–5 microsecond) electron beam. Spatial focusing was accomplished using multiple-stage acceleration of the ions. In the first stage, a low voltage (−150 V) drawout pulse is applied to the source region that compensates for ions formed at different locations, while the second (and other) stages complete the acceleration of the ions to their final kinetic energy (−3 keV). A short time-delay (1–7 microseconds) between the ionization and drawout pulses compensates for different initial kinetic energies of the ions, and is designed to improve mass resolution. Because this method required a very fast (40 ns) rise time pulse in the source region, it was convenient to place the ion source at ground potential, while the drift region floats at −3 kV. The instrument was commercialized by Bendix Corporation as the model NA-2, and later by CVC Products (Rochester, N.Y.) as the model CVC-2000 mass spectrometer. The instrument has a practical mass range of 400 daltons and a mass resolution of 1/300, and is still commercially available.

There have been a number of variations on this instrument. Muga (TOFTEC, Gainsville) has described a velocity compaction technique for improving the mass resolution (Muga velocity compaction). Chatfield et al. (Chatfield FT-TOF) described a method for frequency modulation of gates placed at either end of the flight tube, and Fourier transformation to the time domain to obtain mass spectra. This method was designed to improve the duty cycle.

Cotter et al. (VanBreeman, R. B.: Snow, M.: Cotter, R. J., Int. J. Mass Spectrom. Ion Phys. 49 (1983) 35.; Tabet, J. C.; Cotter, R. J., Anal. Chem. 56 (1984) 1662; Olthoff, J. K.; Lys, I.: Demirev, P.: Cotter, R. J., Anal. Instrumen. 16 (1987) 93, modified a CVC 2000 time-of-flight mass spectrometer for infrared laser desorption of involatile biomolecules, using a Tachisto (Needham, Mass.) model 215G pulsed carbon dioxide laser. This group also constructed a pulsed liquid secondary time-of-flight mass spectrometer (liquid SIMS-TOF) utilizing a pulsed (1–5 microsecond) beam of 5 keV cesium ions, a liquid sample matrix, a symmetric push/pull arrangement for pulsed ion extraction (Olthoff, J. K.; Cotter, R. J., Anal. Chem. 59 (1987) 999–1002.; Olthoff, J. K.; Cotter, R. J., Nucl. Instrum. Meth. Phys. Res. B-26 (1987) 566–570. In both of these instruments, the time delay range between ion formation and extraction was extended to 5–50 microseconds, and was used to permit metastable fragmentation of large molecules prior to extraction from the source. This in turn reveals more structural information in the mass spectra.

The plasma desorption technique introduced by Macfarlane and Torgerson in 1974 (Macfarlane, R. D.; Skowronski, R. P.; Torgerson, D. F., Biochem. Biophys. Res Commoun. 60 (1974) 616.) formed ions on a planar surface placed at a voltage of 20 kV. Since there are no spatial uncertainties, ions are accelerated promptly to their final kinetic energies toward a parallel, grounded extraction grid, and then travel through a grounded drift region. High voltages are used, since mass resolution is proportional to Uo/;eV, where the initial kinetic energy, Uo/ is of the order of a few electron volts. Plasma desorption mass spectrometers have been constructed at Rockefeller (Chait, B. T.; Field, F. H., J. Amer. Chem. Soc. 106 (1984) 193), Orsay (LeBeyec, Y.; Della Negra, S.; Deprun, C.; Vigny, P.; Giont, Y. M., Rev. Phys. Appl 15 (1980) 1631), Paris (Viari, A.; Ballini, J. P.; Vigny, P.; Shire, D.; Dousset, P., Biomed. Environ. Mass Spectrom, 14 (1987) 83), Upsalla (Hakansson, P.; Sundqvist B., Radiat. Eff. 61 (1982) 179) and Darmstadt (Becker, O.; Furstenau, N.; Krueger, F. R.; Weiss, G.; Wein, K., Nucl. Instrum. Methods 139 (1976) 195). A plasma desorption time-of-flight mass spectrometer has bee commercialized by BIO-ION Nordic (Upsalla, Sweden). Plasma desorption utilizes primary ion particles with kinetic energies in the MeV range to induce desorption/ionization. A similar instrument was constructed at Manitobe (Chain, B. T.; Standing, K. G., Int. J. Mass Spectrum. Ion Phys. 40 (1981) 185) using primary ions in the keV range, but has not been commercialized.

Matrix-assited laser desorption, introduced by Tanaka et al. (Tanaka, K.; Waki, H.; Ido, Y.; Akita, S.; Yoshida, Y.; Yoshica, T., Rapid Commun. Mass Spectrom. 2 (1988) 151) and by Karas and Hillenkamp (Karas, M.; Hillenkamp, F., Anal. Chem. 60 (1988) 2299) utilizes TOFMS to measure the molecular weights of proteins in excess of 100,000 daltons. An instrument constructed at Rockefeller (Beavis, R. C.; Chait, B. T., Rapid Commun. Mass Spectrom. 3 (1989) 233) has been commercialized by VESTEC (Houston, Tex.), and employs prompt two-stage extraction of ions to an energy of 30 keV.

Time-of-flight instruments with a constant extraction field have also been utilized with multi-photon ionization, using short pulse lasers.

The instruments described thus far are linear time-of-flights, that is: there is no additional focusing after the ions are accelerated and allowed to enter the drift region. Two approaches to additional energy focusing have been utilized: those which pass the ion beam through an electrostatic energy filter.

The reflectron (or ion mirror) was first described by Mamyrin (Mamyrin, B. A.; Karatajev. V. J.; Shmikk, D. V.; Zagulin, V. A., Sov. Phys., JETP 37 (1973) 45). At the end of the drift region, ions enter a retarding field from which they are reflected back through the drift region at a slight angle. Improved mass resolution results from the fact that ions with larger kinetic energies must penetrate the reflecting field more deeply before being turned around. These faster ions than catch up with the slower ions at the detector and are focused. Reflectrons were used on the laser microprobe instrument introduced by Hillenkamp et al. (Hillenkamp, F.; Kaufmann, R.; Nitsche, R.; Unsold, E., Appl. Phys. 8 (1975) 341) and commercialized by Leybold Hereaus as the LAMMA (LAser Microprobe Mass Analyzer). A similar instrument was also commercialized by Cambridge Instruments as the IA (Laser Ionization Mass Analyzer). Benninghoven (Benninghoven reflectron) has described a SIMS (secondary ion mass spectrometer) instrument that also utilizes a reflectron, and is currently being commercialized by Leybold Hereaus. A reflecting SIMS instrument has also been constructed by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Lebeyec (Della-Negra, S.; Lebeyec, Y., in Ion Formation from Organic Solids IFOS III, ed. by A. Benninghoven, pp 42–45, Springer-Verlag, Berlin (1986)) described a coaxial reflectron time-of-flight that reflects ions along the same path in the drift tube as the incoming ions, and records their arrival times on a channelplate detector with a centered hole that allows passage of the initial (unreflected) beam. This geometry was also utilized by Tanaka et al. (Tanaka, K.; Waki, H.; Ido, Y.; Akita, S.; Yoshida, T., Rapid Comun. Mass Spectrom. 2 (1988) 151) for matrix assisted laser desorption. Schlag et al. (Grotemeyer, J.; Schlag, E. W., Org. Mass Spectrom. 22 (1987) 758) have used a reflectron on a two-laser instrument. The first laser is used to ablate solid samples, while the second laser forms ions by multiphoton ionization. This instrument is currently available from Bruker. Wollnik et al. (Grix., R.; Kutscher, R.; Li, G.; Gruner, U.; Wollnik, H., Rapid Commun. Mass Spectrom. 2 (1988) 83) have described the use of reflectrons in combination with pulsed ion extraction, and achieved mass resolutions as high as 20,000 for small ions produced by electron impact ionization.

An alternative to reflectrons is the passage of ions through an electrostatic energy filter, similar to that used in double-focusing sector instruments. This approach was first described by Poschenroeder (Poschenroeder, W., Int. J. Mass Spectrom. Ion Phys. 6 (1971) 413). Sakurai et al. (Sakuri, T.; Fujita, Y; Matsuo, T.; Matsuda, H; Katakuse, I., Int. J. Mass Spectrom. Ion Processes 66 (1985) 283) have developed a time-of-flight instrument employing four electrostatic energy analyzers (ESA) in the time-of-flight path. At Michigan State, an instrument known as the ETOF was described that utilizes a standard ESA in the TOF analyzer (Michigan ETOF).

Lebeyec et al. (Della-Negra, S.; Lebeyec, Y., in Ion Formation from Organic Solids IFOS III, ed. by A. Benninghoven, pp 42–45, Springer-Verlag, Berlin (1986)) have described a technique known as correlated reflex spectra, which can provide information on the fragment ion arising from a selected molecular ion. In this technique, the neutral species arising from fragmentation in the flight tube are recorded by a detector behind the reflectron at the same flight time as their parent masses. Reflected ions are registered only when a neutral species is recorded within a preselected time window. Thus, the resultant spectra provide fragment ion (structural) information for a particular molecular ion. This technique has also been utilized by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Although TOF mass spectrometers do not scan the mass range, but record ions of all masses following each ionization event, this mode of operation has some analogy with the linked scans obtained on double-focusing sector instruments. In both instruments, MS/MS information is obtained at the expense of high resolution. In addition correlated reflex spectra can be obtained only on instruments which record single ions on each TOF cycle, and are therefore not compatible with methods (such as laser desorption) which produce high ion currents following each laser pulse.

New ionization techniques, such as plasma desorption (Macfarlane, R. D.; Skowronski, R. P.; Torgerson, D. F.; Biochem. Bios. Res. Commun. 60 (1974) 616), laser desorption (VanBreemen, R. B.; Snow, M.; Cotter, R. J., Int. J. Mass Spectrom. Ion Phys. 49 (1983) 35; Van der Peyl, G. J. Q.; Isa, K.; Haverkamp, J.; Kistemaker, P. G., Org. Mass Spectrom. 16 (1981) 416), fast atom bombardment (Barber, M.; Bordoli, R. S.; Sedwick, R. D.; Tyler, A. N., J. Chem. Soc., Chem. Commun. (1981) 325-326) and electrospray (Meng, C. K.; Mann, M.; Fenn, J. B., Z. Phys. D10 (1988) 361), have made it possible to examine the chemical structures of proteins and peptides, glycopeptides, glycolipids and other biological compounds without chemical derivatization. The molecular weights of intact proteins can be determined using matrix assisted laser desorption ionization (MALDI) on a TOF mass spectrometer or electrospray ionization. For more detailed structural analysis, proteins are generally cleaved chemically using CNBr or enzymatically using trypsinor other proteases. The resultant fragments, depending upon size, can be mapped using MALDI, plasma desorption or fast atom bombardment. In this case, the mixture of peptide fragments (digest) is examined directly resulting in a mass spectrum with a collection of molecular ion corresponding to the masses of each of the peptides. Finally, the amino acid sequences of the individual peptides which make up the whole protein can be determined by fractionation of the digest, followed by mass spectral analysis of each peptide to observe fragment ions that correspond to its sequence.

It is the sequencing of peptides for which tandem mass spectrometry has its major advantages. Generally, most of the new ionization techniques are successful in producing intact molecular ion, but not in producing fragmentation. In the tandem instrument the first mass analyzer passes molecular ions corresponding to the peptide of interest. These ions are fragmented in a collision chamber, and their products extracted and focused into the second mass analyzer which records a fragment ion (or sequence) spectrum.

A tandem TOFMS consists of two TOF analysis regions with an ion gate between the two regions. As in conventional TOFMS, ions of increasing mass have decreasing velocities and increasing flight times. Thus, the arrival time of ions at the ion gate at the end of the first TOF analysis region is dependent on the mass-to-charge ratio of the ions. If one opens the ion gate only at the arrival time of the ion mass of interest, then only ions of that mass-to-charge will be passed into the second TOF analysis region.

However, it should be noted that the products of an ion dissociation that occurs after the acceleration of the ion to its final potential will have the same velocity as the original ion. The product ions will therefore arrive at the ion gate at the same time as the original ion and will be passed by the gate (or not) just as the original ion would have been.

The arrival times of product ions at the end of the second TOF analysis region is dependent on the product ion mass because a reflectron is used. As stated above, product ions have the same velocity as the reactant ions from which they originate. As a result, the kinetic energy of a product ion is directly proportional to the product ion mass. Because the flight time of an ion through a reflectron is dependent on the kinetic energy of the ion, and the kinetic energy of the product ions are dependent on their masses, the flight time of the product ions through the reflectron is dependent on their masses.

SUMMARY OF THE INVENTION

In the field of TOFMS, ion gating is typically accomplished by deflecting unwanted ions to a trajectory which does not lead to detection. Such deflection is generally accomplished using deflection plates. In conventional TOFMS, two metal plates adjacent to one another, on opposite sides of the ion beam, and approximately parallel to the ion beam form the deflector. When a strong enough potential difference is applied between the plates, ions passing between the plates will be deflected out of the beam. Mass selection is accomplished by applying a potential when unwanted ions are between the plates and by grounding the plates when the desired mass ions are between the plates However, the mass resolution of such selection is typically low (i.e. [18]20).

The Bradbury-Nielson gate is one alternative method of ion gating in TOFMS. In conventional B-N Gates, an array of fine wires are arranged across the ion beam path and biased such that adjacent wires have the same magnitude potential but opposite polarity. The biased wires deflect ions thus preventing them from being detected. Because the spatial extent of the B-N gate is much less than that of conventional deflection plates, the resolution of such a gate can be as much as an order of magnitude greater than conventional deflection plates under identical conditions. However, the magnitude of the potentials required by the B-N gate are relatively high (about +/−1 kV).

The present invention combines features of these two types of gating methods to produce a gate with superior characteristics. That is, an array of metal plates is used instead of the wires in the B-N gate. Consequently, the potentials required in the operation of the extended B-N gate are lower than those of a conventional B-N gate. The plates have a smaller spatial extent in the TOF direction than conventional deflection plates. Thus, the extended B-N gate has a higher mass resolution. Also, the extended B-N gate can "gate" ions at much lower applied voltages under a given set of conditions. Also, the B-N gate is self shielding and can operate at low voltages.

The invention is a specific design for a tandem TOF mass spectrometer incorporating two analyzers. This instrument incorporates Einsel lens focusing, and a patented (U.S. Pat. No. 4,731,532) two stage grided reflector.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

FIG. 4A is a view of the plate arrangement according to a conventional ion deflector, used in TOFMS;

FIG. 4B is a view of the modified ion trajectory resulting from the use of the present invention, which is an extended B-N gate, where wires are used instead of plates;

DETAILED DESCRIPTION OF THE PREFERRED EMBODIMENT

Figure 1:
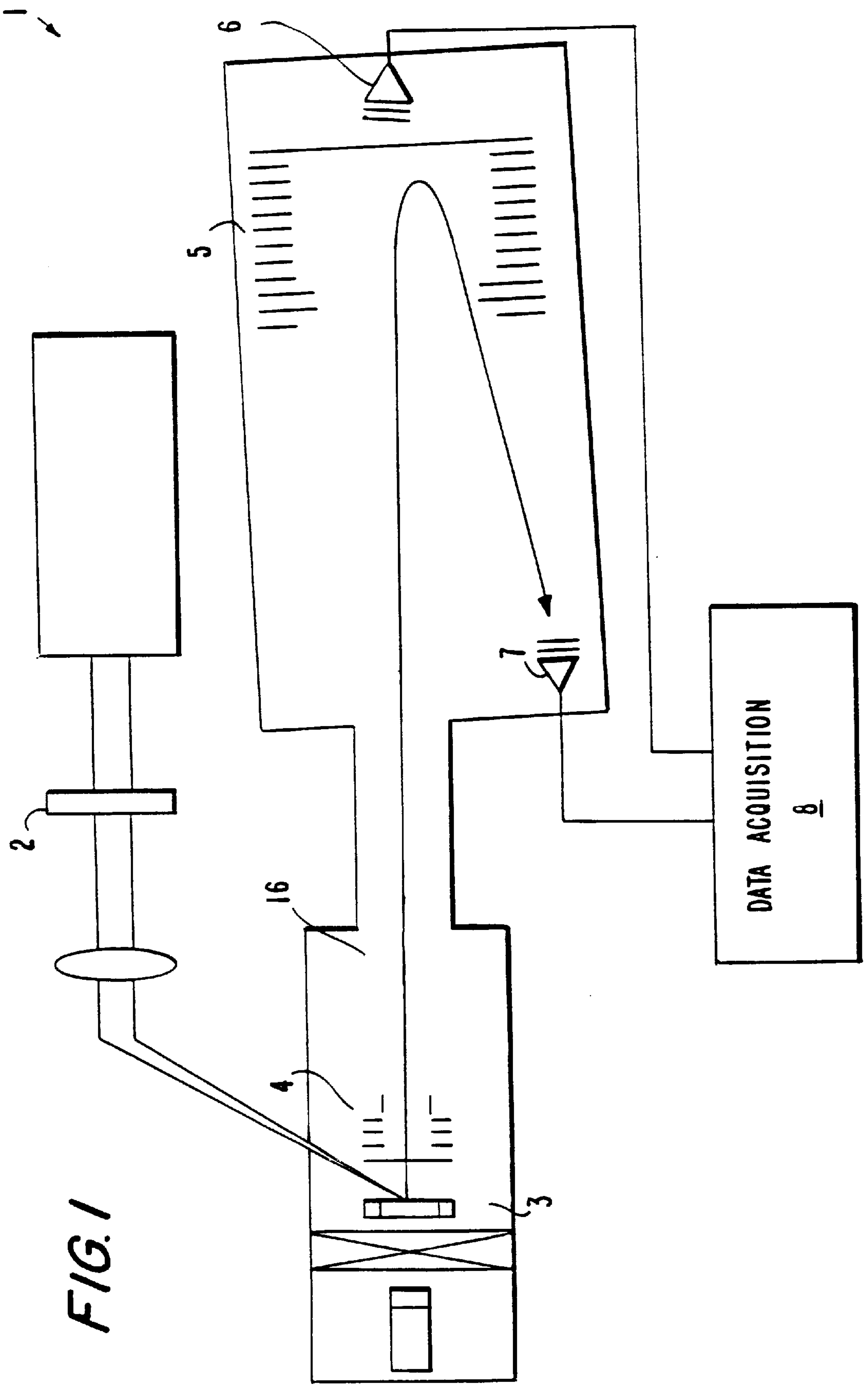
FIG. 1 is a schematic view of prior art commonly referred to as a REFLEX spectrometer.

With respect to FIG. 1, a prior art TOFMS 1 is shown, with a laser system 2, ion source 3, deflector 4, reflector 5, linear detector 6, reflector detector 7 and a data acquisition unit 8. In FIG. 1, the radiation from the laser system 2 generates ions from a solid sample. Ions are accelerated through, and out of, the ion source 3 by an electrostatic field. Some unwanted ions can be removed from the ion beam using the deflector 4. The remaining ions may drift through the spectrometer until they arrive at the linear detector 6. Alternatively, the reflector 5 may be used to reflect the ions so that they travel to the reflector detector 7. The mass and abundance of the ions is measured via the data acquisition system 8 as the flight time of the ions from the source 2 to one of the detectors 6 or 7 and the signal intensity at the detectors respectively.

Figure 2:
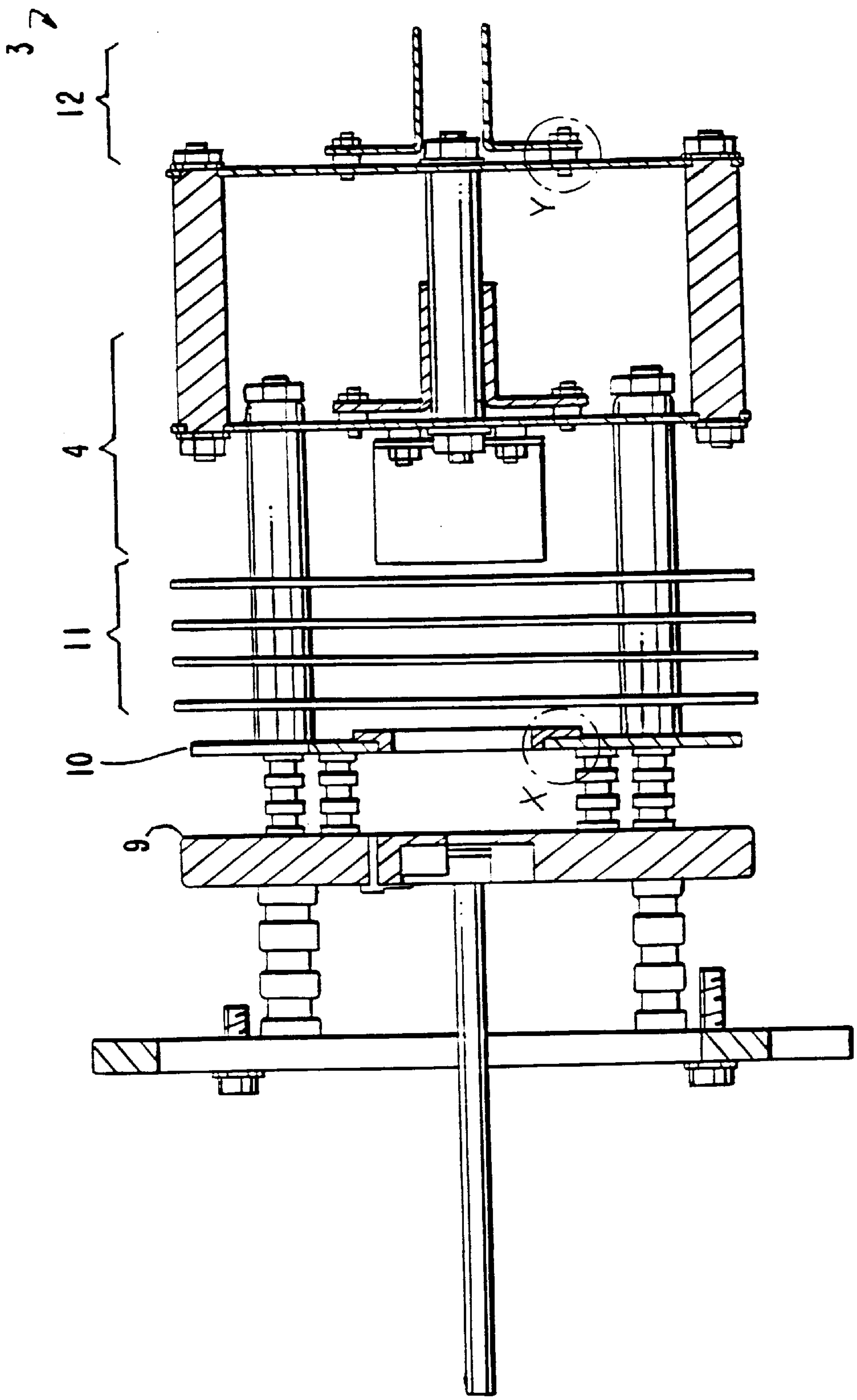
FIG. 2 is diagram of an ion source, as used with the present invention.

With respect to FIG. 2, a diagram of an ion source 3 as used with the present invention is shown. Ions are generated at the surface of the sample plate 9 which is biased to a high voltage (e.g. 20 kV). Ions are accelerated by an electrostatic field toward the extraction plate 10 which is held at ground potential. Ions are focused by the electrostatic lens system 11, and steered in two dimensions by the deflection plates 4. Finally, some types of unwanted ions are removed from the ion beam by blanking plates 12.

Figure 3:
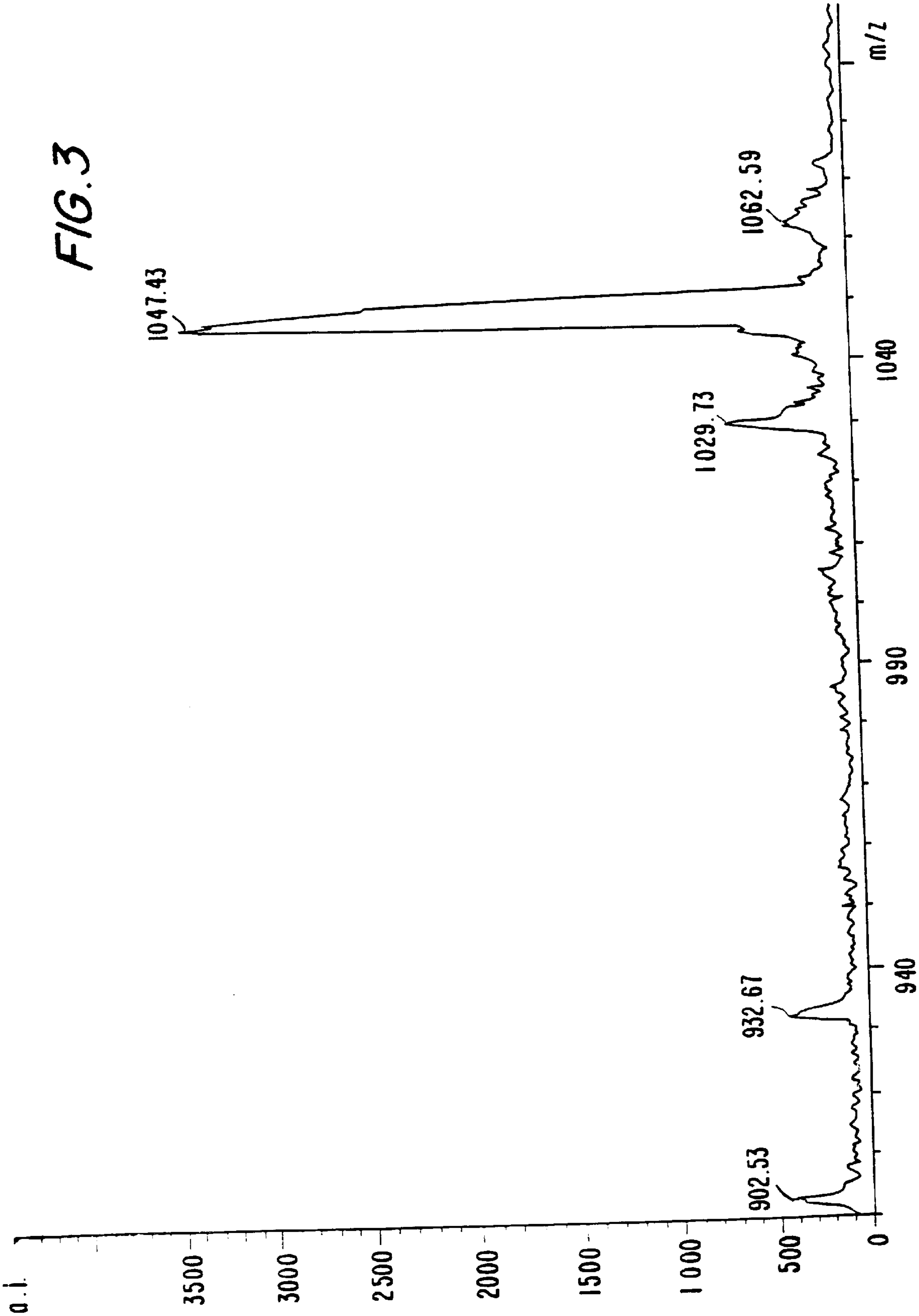
FIG. 3 is a graph of the mass spectrum of angiotensin II showing the molecular ion at mass 1047 amu, using a prior art TOF system.

With respect to FIG. 3, a graph of the mass spectrum of angiotensin II showing the molecular ion at mass 1047 amu, using a prior art TOF system (REFLEX) is shown. This spectrum was recorded using reflector 5 and detector 7. As a result, it is possible to observe some ions (at apparent masses 902, 933, and 1030 amu) which are products of the dissociation of the molecular ions.

FIG. 4A is a view of the electrode arrangement according to the prior art TOFMS systems. In TOFMS, ions of greater and lesser masses are removed by deflecting ions from the principal beam axis 151. This is accomplished by using deflection plates 152 and 154. In conventional TOFMS spectrometers, two metal plates 152 and 154 are adjacent to one another, on opposite sides of the ion beam, and approximately parallel to the ion beam, to form the complete deflector assembly as shown in FIG. 4A. By energizing plates 152 to +V and plate 154 to −V, ion beam 151 is deflected along a course 151'. In this manner, plates 152 and 154 are used to gate ions in a TOFMS application. Such a gate may be inserted into any point or position of a TOFMS system, between the source and analyzer region. For example, such a gate may be located at the end of source 3 in FIG. 2.

Conversely, in FIG. 4B, a view of the ion deflector according to a B-N gate, is shown. Importantly, wires 153, 155, 156, 157 and 158 are used as an alternative method of ion selection (gating) in TOFMS. A B-N gate is used as a method of ion selection in TOFMS, by substituting wires 153, 155, 156, 157, and 158 for plates 152 and 154. In particular, ion trajectory 159 (which is identical to 151) is altered, as shown at 159', so that certain ions may be removed from the principal beam 159 for analysis purposes. An array of fine wires 153, 155, 156, 157, and 158 are arranged across the ion beam 159 (which results in the deflected path 159'), and biased such that adjacent wires have the same magnitude (V) potential but opposite polarity, as noted in FIG. 4B. Because the spatial extent of the B-N gate is much less than that of conventional deflection plates, the resolution of such a gate can be as much as an order of magnitude greater than conventional deflection plates (e.g., in FIG. 4A) under identical conditions. However, the magnitude of the potentials required by the B-N gate are relatively high (about +/−1 kV in most TOFMS applications).

Figure 5:
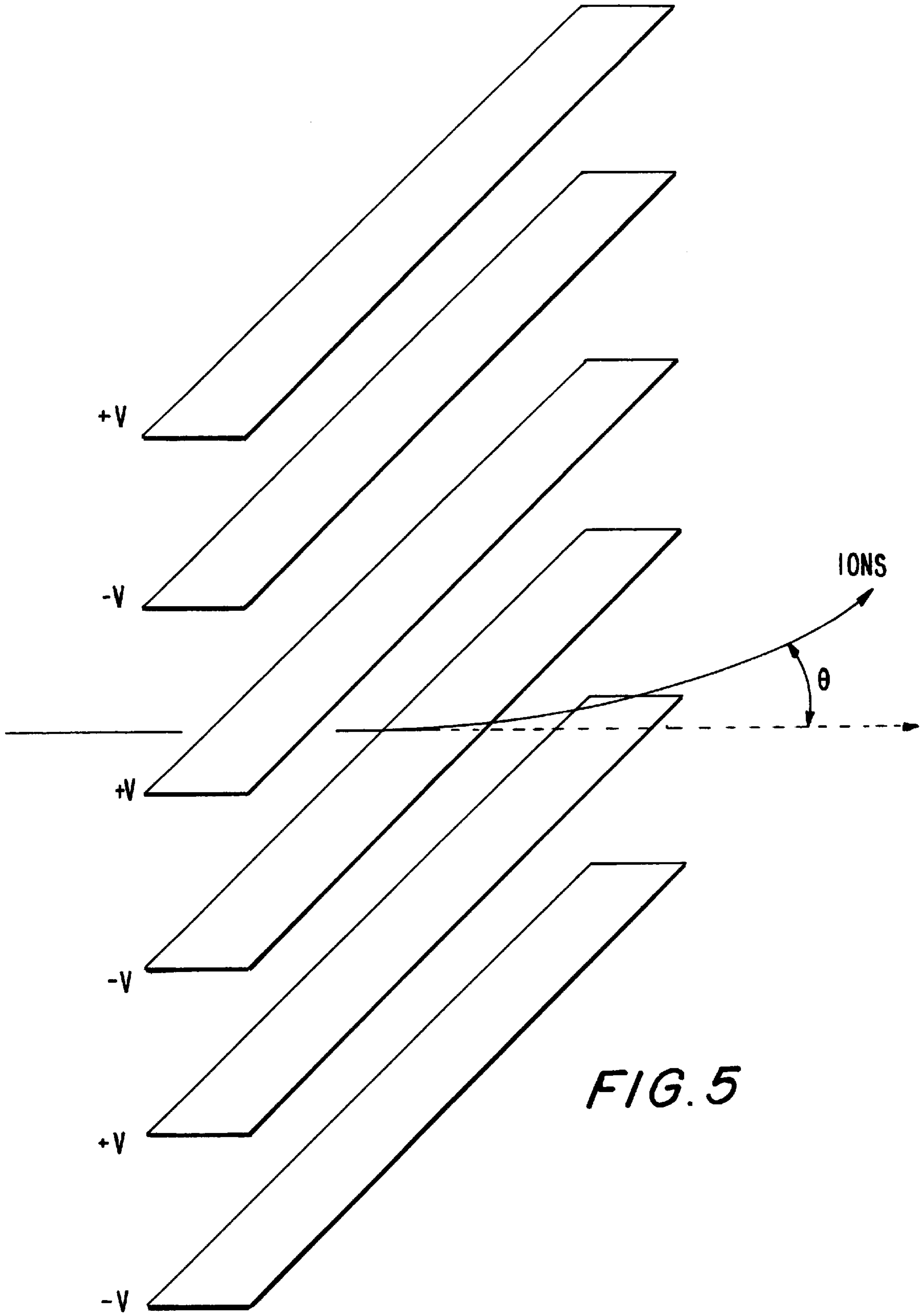
FIG. 5 is a view of the ion trajectory according to the present invention, where plates are shown.

FIG. 5 is a view of the ion trajectory 162 (as modified to 162') according to the present invention, where plates (and not wires) are shown. Plates 161, 163, 164, 165, 166 and 167 are energized with equal magnitude (V), but opposite polarity potentials, to produce the angle θ, the angle of deviation away from the principal path of the ion beam path 162. The resulting path is path 162'. According to an embodiment of the extended B-N gate, as shown in FIG. 5, thin metal plates (about 0.1 mm in thickness) are placed adjacent and parallel to one another. All the plates are biased to the same magnitude potential (V), and they are biased with opposite polarities (+V and −V). Ions passing between two adjacent plates are deflected by an angle:

$$\mathrm{Tan}(\theta) = \frac{qV}{\epsilon}\left(\frac{L}{d}\right) \tag{4}$$

where θis the angle of deflection (as shown in FIG. 5), V is the voltage on the plates, and L is the length of the plates in the flight direction 162, q is the elemental charge, and ϵis the kinetic energy of the ion. Note that under a given set of conditions, an experimenter can obtain the same degree of deflection at, for example, half the voltage by doubling L or decreasing d by a factor of 2. Thus, by adjusting L and d, one may "gate" 10 keV ions by applying +/−10 V to the plates. Also, the dimensions of a conventional B-N gate can be adjusted so that it operates at similar voltages. In practice, however, the wires shown in FIG. 4B would be close enough to block the majority of the ion beam 162, a desirable result in TOFMS. The added dimension, L, of the extended B-N gate allows it to be used at these voltages with an excellent transmission efficiency.

Figure 6A:
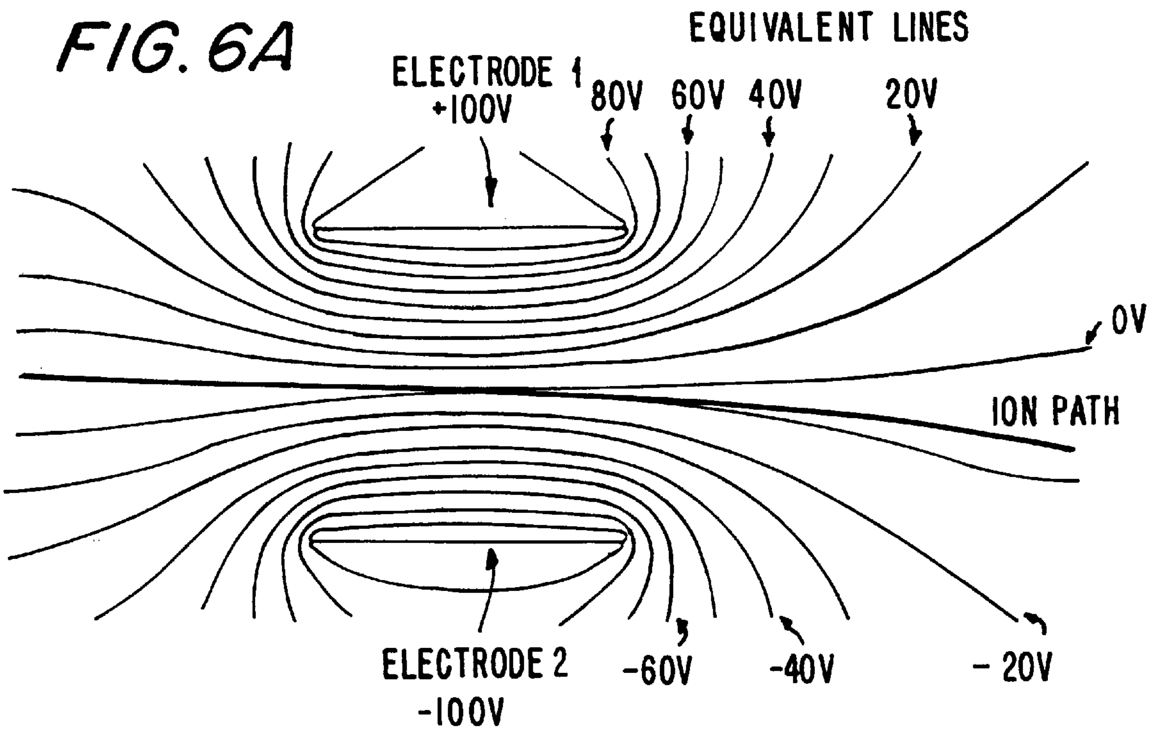
FIG. 6A is a diagram depicting the electric fields associated with conventional deflection plates.

The advantages of the extended Bradbury-Nielson gate of the present invention over conventional deflection plates are demonstrated in FIGS. 6A and 6 B. FIGS. 6A and 6 B show a cross-sectional view of the two devices, equipotential lines as determined by a numerical calculation, and a representative ion trajectory through the energized devices. The calculations were performed assuming that the electrodes of the two devices were energized to +or −100 V, and the ion kinetic energy was 2 kev. The geometries of the two devices were then chosen so as to produce the same degree of ion deflection in both devices. (Ions in each case begin on the left of the page and travel towards the right.)

Figure 6B:
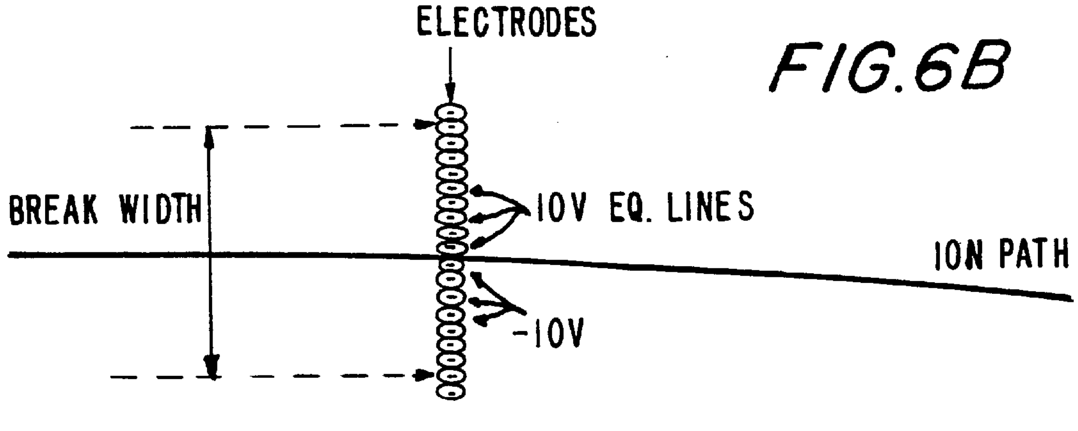
FIG. 6B is a diagram of the electric fields associated with the B-N gate of the present invention.

One advantage of the extended Bradbury-Nielson gate over conventional deflection plates is readily apparent upon examination of the equipotential lines around the two devices. As seen in FIG. 6A, the equipotential lines extend far from the device itself. This extended field represented can influence ion flight times and trajectories of ions in undesirable ways. In contrast, the equipotential lines of the extended Bradbury-Nielson gate are confined to the immediate vicinity of the device (FIG. 6B). Note in FIG. 6B that only the +/−10 V equipotential lines are shown while in FIG. 6A equipotential lines in the range of +to −90 V are shown. All equipotential lines of greater absolute magnitude are closer to the electrodes than the +/−10 V lines.

Because the Bradbury-Nielson gate—and its electric field—have a lesser extent in the direction of ion motion, the ultimate mass resolution of the device is higher than that of conventional deflection plates. In the case of ion gating, the resolution of the gating devices can be approximated as:

$$R = \frac{L}{2l} \tag{5}$$

where R is the mass resolution of the gating device, L is the distance from the source to the gating device, and 1 is the effective length of the gating device—including its associated electric field—in the direction of ion motion. The deflection plates in FIG. 6A are 40 mm in the direction of ion motion. When considering the extent of the electric field around the device, the effective length of the device should be about 80 mm. In comparison, the effective extent of the extended B-N device is approximately 4 mm. This implies in accordance with equation 5 that the resolving power of the extended B-N gate is approximately 20 times that of the deflection plates.

Note that the distance between the two deflection plates of FIG. 6A is relatively large (40 mm) in order to allow them to be used with an ion beam of relatively large dimensions. The extended Bradbury-Nielson gate can also be used with large ion beams because the elements are thin and spaced at regular intervals across the beam path.

Figure 7A:
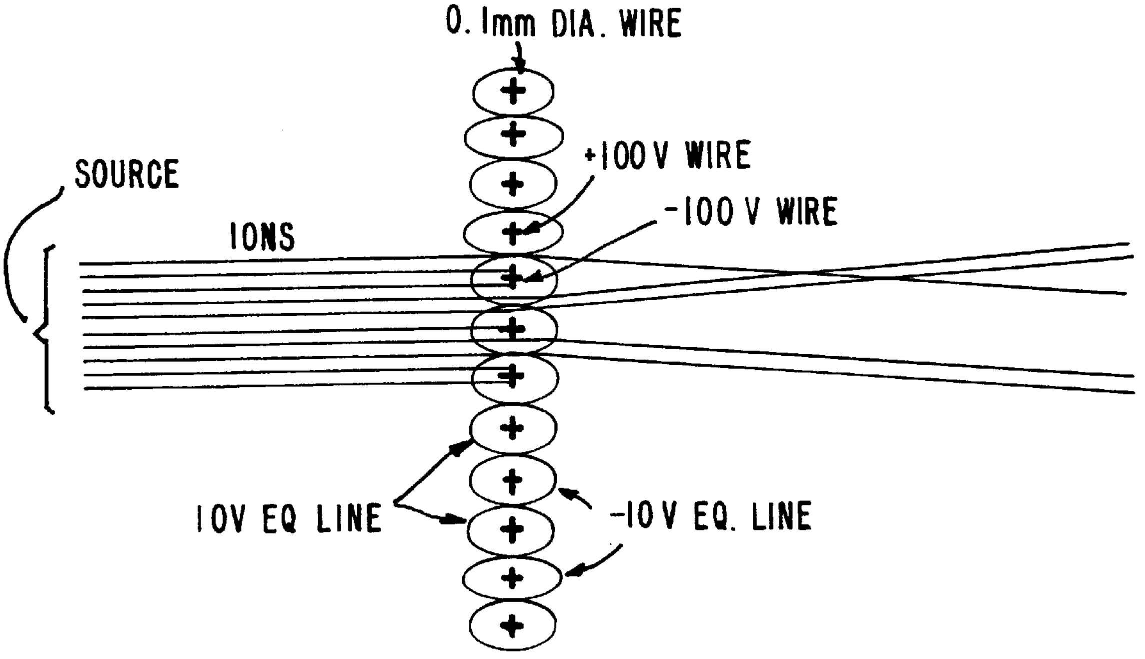
FIG. 7A is a diagram depicting the electric fields associated with, and the ion trajectories through, a conventional B-N gate.

The advantages of the extended Bradbury-Nielson gate over conventional Bradbury-Nielson gates include the facts set forth in FIGS. 7A & B. Again, the potentials on the elements of the gates are +and −100 V in both cases and the geometries of the two devices were chosen so as to produce the same degree of ion deflection. Two factors to be considered in the comparison of these two devices are the transmission efficiency of the deenergized gate and the potential required to produce the necessary ion deflection. These two parameters are directly related to one another. That is, as the transmission efficiency of the deenergized device increases, the potential necessary to produce the desired ion deflection also increases. The main advantage of the extended Bradbury-Nielson gate of the conventional gate is that it can have a high deenergized transmission efficiency and still have a low operating voltage.

Figure 7B:
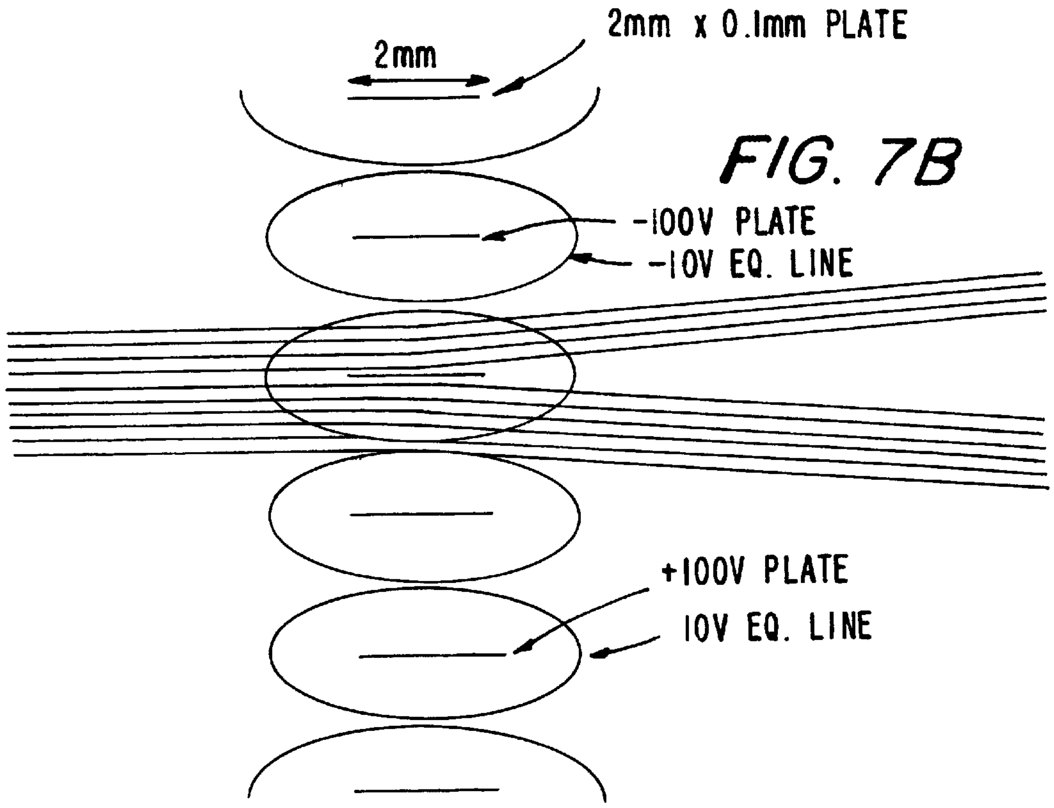
FIG. 7B is a diagram depicting the electric fields associated with, and ion trajectories through, the extended B-N gate according to the present invention.

FIGS. 7A and 7B show a cross-sectional view of a conventional Bradbury-Nielson gate (7A) and an extended Bradbury-Nielson gate (7B). The plates used in the extended Bradbury-Nielson gate are assumed to be 0.1 mm thick and the wires of the conventional Bradbury-Nielson gate are assumed to be 0.1 mm in diameter. The plates of the extended Bradbury-Nielson gate are 2 mm long and separated from one another by 2 mm. In contrast, to operate at the same voltage and produce the same ion deflection, the wires of the conventional Bradbury-Nielson gate must be 0.1 mm from one another. As a result, the transmission efficiency of the conventional Bradbury-Nielson gate (50%) is much less than that of the extended Bradbury-Nielson gate (95%).

Figure 8:
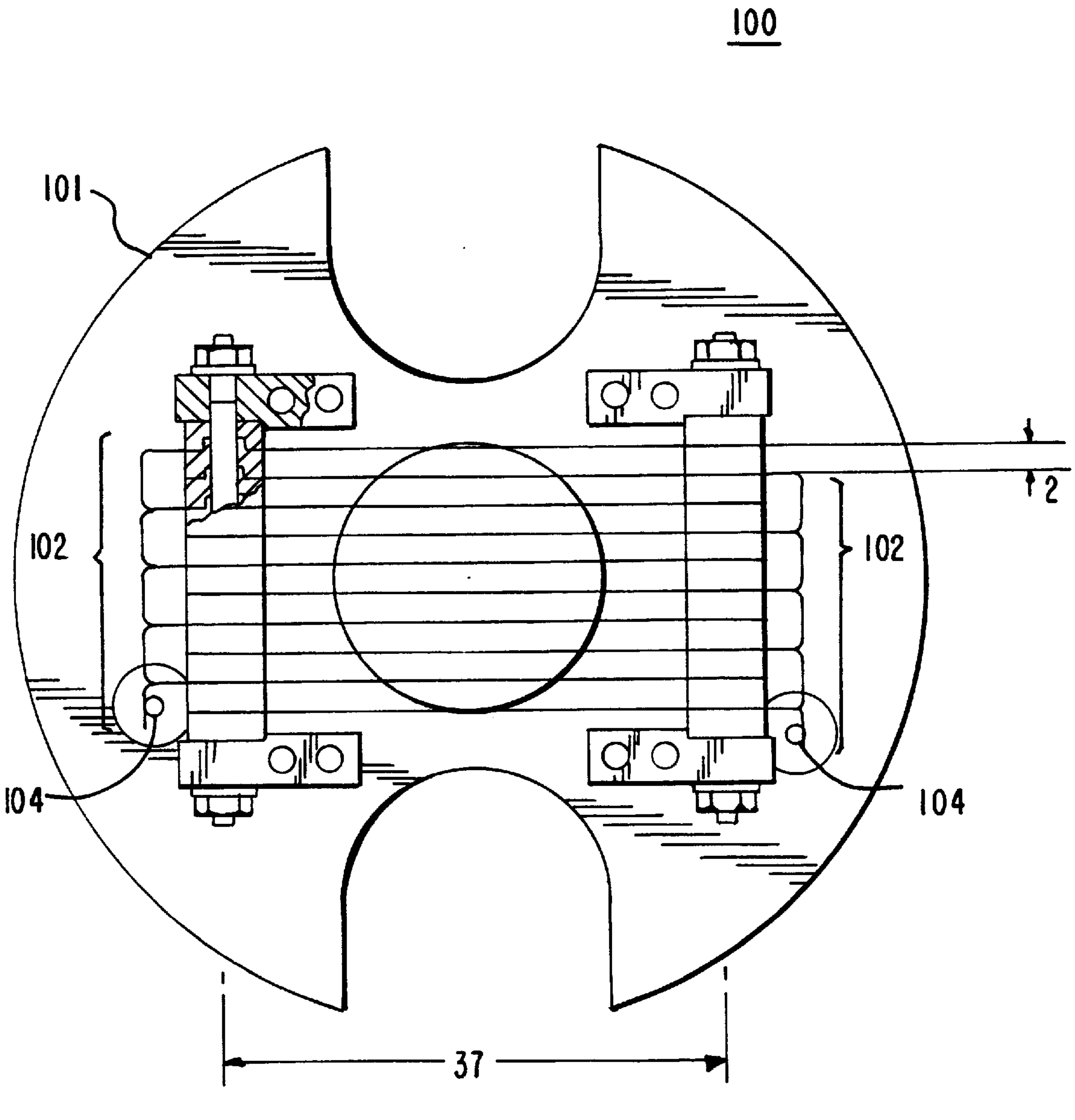
FIG. 8 is a diagram of the extended B-N gate as used in the REFLEX spectrometer.

With respect to FIG. 8, a diagram of the extended Bradbury-Nielson gate 100 according to the present invention is shown. The embodiment shown consists of a shielding plate 101, insulating spacers 102, metal deflection plates 103, and feedthroughs 104 for electrical contact. To remove ions from the ion beam, the metal plates 103 are energized through feedthroughs 104 while the ions to be deselected are between the metal plates 103. To select ions, the plates 103 are deenergized (i.e. held at ground potential) during the passage of the ions through the device 100.

Figure 9:
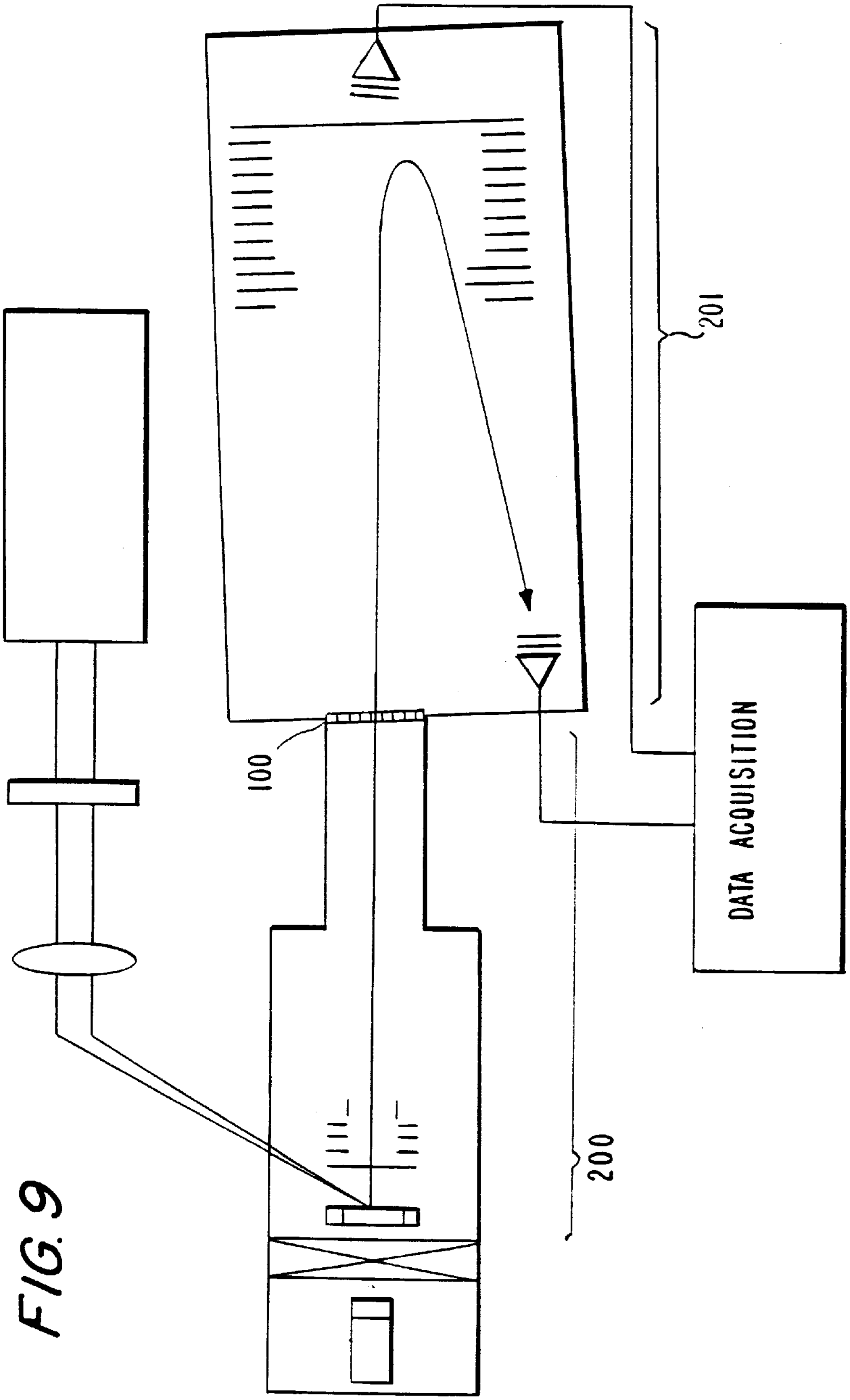
FIG. 9 is a a schematic view of the REFLEX spectrometer including the extended Bradbury-Nielson gate.

With respect to FIG. 9, the previously described REFLEX instrument 1 now including an extended B-N gate 100 according to the present invention. The extended B-N gate 100 is located between two TOF analysis regions 200 and 201. In the first of the TOF analysis regions 200, the parent ions—the original ions produced from the source 3—are mass analyzed. The parent ion of interest is selected by gating the ion beam using the extended B-N gate 200. Using the extended B-N gate 100 it is possible to allow only those parent ions of interest to pass from the first 200 to the second 201 analysis region. In the second analysis region 201, the daughter ions—generated by the dissociation of the selected parent ion—are mass analyzed and recorded via reflector 5, detector 7, and data acquisition system 8.

Figure 10:
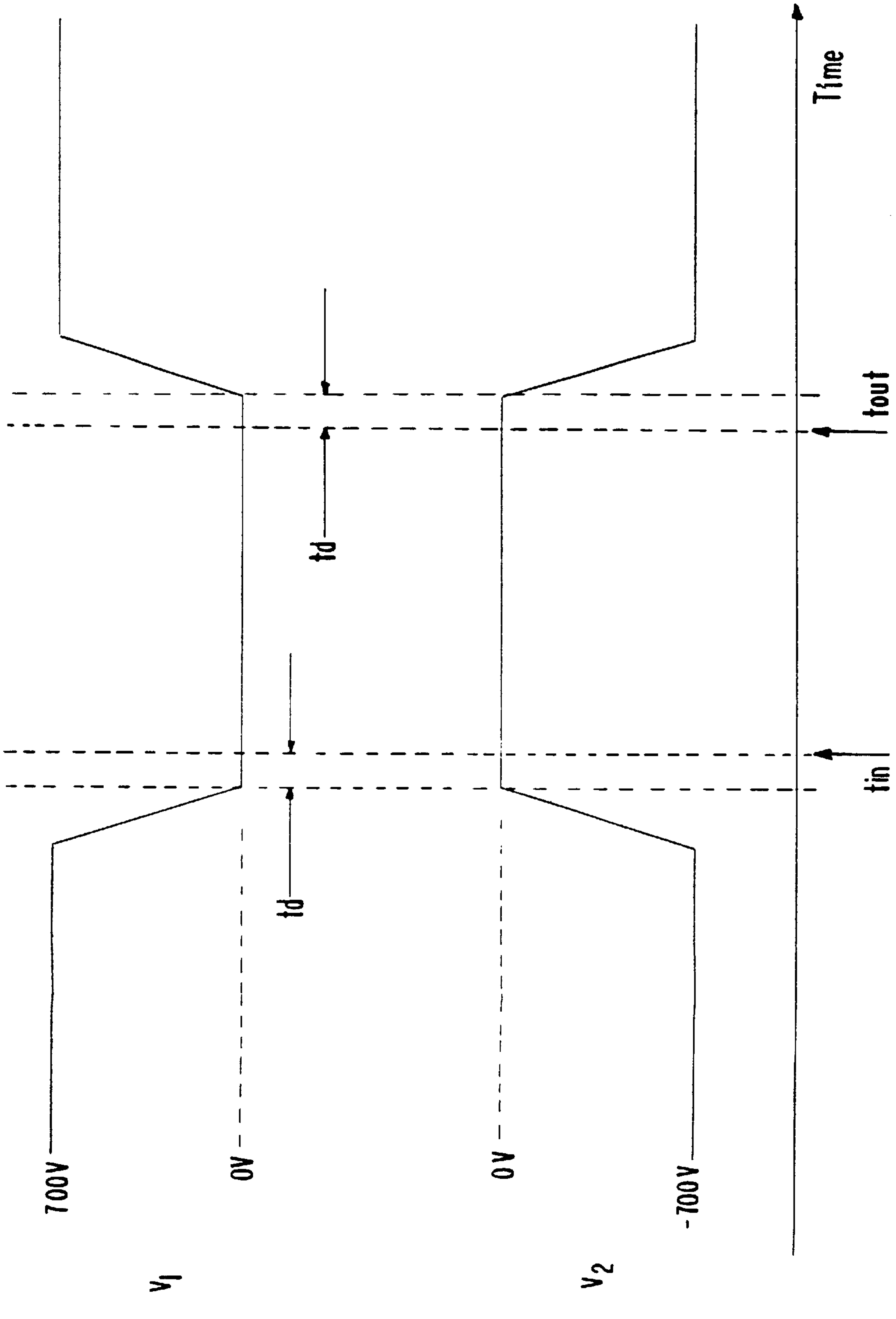
FIG. 10 is an example timing diagram of the use of the B-N gate in the REFLEX spectrometer and FIG. 11 is a graph of a daughter ion spectrum of angiotensin II, using the extended B-N gate of the present invention.

With respect to FIG. 10, an example timing diagram is shown. From the time of ion generation until a short time before the ion of interest enters the extended B-N gate 100, the potentials on the plates 103 are held at +/−700 V as discussed with respect to FIG. 4. This causes all ions of lower mass than the ions of interest to be deflected out of the beam. At time tin the ions of interest arrive at the gate 100 and at time tout, the ions exit the gate. Some time td before the ions of interest arrive at the gate 100, the potential on plates 103 are brought to ground potential. Plates 103 are held at ground potential until some short time td after the ions of interest leave the gate 100. Thereafter, the potentials on the plates 103 are maintained at +/−700 V. This causes all ions of higher mass than the ions of interest to be deflected out of the beam.

Figure 11:
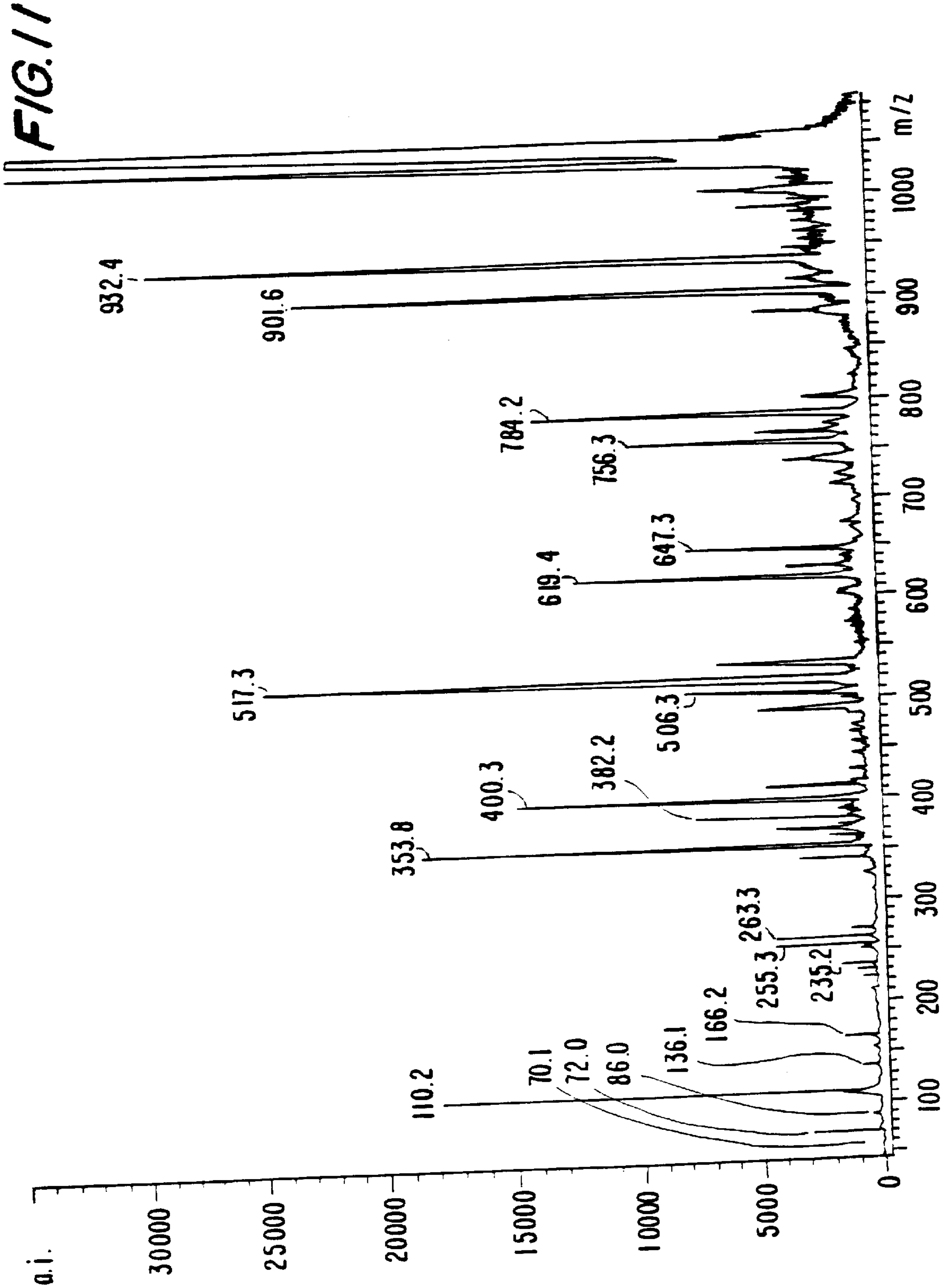

With respect to FIG. 11, a graph of a daughter ion spectrum of angiotensin II, using the extended B-N gate as described above is shown. The mass of the daughter ions are determined via their flight time from source 2 to detector 7. When a single stage reflectron is used, the relationship between parent ion mass, daughter ion mass, and total daughter ion flight time is given by:

$$t = (L_1 + L_3)\sqrt{\frac{M}{2qV_1}} + \frac{2mL_2}{qV_2}\sqrt{\frac{2qV_1}{M}} \tag{6}$$

where $L_1$, is the distance from the source to the reflectron, $L_2$ is the length of the ref lectron, $L_3$ is the distance from the ref lectron to the detector, $V_1$ is the source potential, $V_2$ is the reflectron potential, M is the parent ion mass, m is the daughter ion mass, and q is the elemental charge. A similar relationship holds when a two stage reflector such as that of the REFLEX spectrometer is used. Using such an equation, it is possible to calibrate a spectrum like that of FIG. 11.

While the foregoing embodiments of the invention have been set forth in considerable detail for the purposes of making a complete disclosure of the invention, it will be apparent to those of skill in the art that numerous changes may be made in such details without departing from the spirit and the principles of the invention.

I claim:

1. An improved time of flight mass spectrometer comprising:

a deflector for deflecting a first ion from an ion path;

a detector for detecting a second ion moving along said ion path; and a mass selector for selecting which of said first or second ions are deflected and which of said first or second ions are detected;

wherein said mass selector comprises more than two electrodes;

wherein each of said electrodes has a cross-sectional area which extends in the direction of said ion path; and wherein said electrodes are parallel and have spatially alternating polarities.

2. An improved time of flight mass spectrometer according to claim 1 wherein at least one of said conductive plates is metallic.

3. An improved time of flight mass spectrometer according to claim 1 wherein said deflector deflects substantially all ions away from said ion path.

4. An improved time of flight mass spectrometer according to claim 1 wherein said detector is responsive to the number of ions not deflected away from said ion path.

5. An improved time of flight mass spectrometer according to claim 1 wherein said ions are deflected away from said ion path along one of two directions.

6.An extended Bradbury-Nielson gate for analyzing ions in a time of flight mass spectrometer comprising:

an ion source;

an ion detector;

a flight tube for transporting ions formed within said ion source; and a gate disposed along said flight tube;

wherein said gate comprises more than two parallel electrodes;

wherein each of said electrodes has a cross-sectional area which extends in the time of flight direction; and wherein said electrodes are aligned to deflect substantially all ions away from the direction of ion propagation along said flight tube.

7. An extended Bradbury-Nielson gate according to claim 6 wherein at least one of said electrodes is conductive.

8. An extended Bradbury-Nielson gate according to claim 7 wherein said conductive electrodes are metallic.

9. An extended Bradbury-Nielson gate according to claim 6 wherein said gate deflects said ions into a uniform direction.

10. An extended Bradbury-Nielson gate according to claim 6 wherein said ion source includes a laser.

11. An extended Bradbury-Nielson gate according to claim 6 wherein a data acquisition system is used to measure the time of flight of ions from said ion source to said detector.

12. An extended Bradbury-Nielson gate according to claim 11 wherein a multiplicity of detectors are used.

13. An extended Bradbury-Nielson gate according to claim 6 wherein a reflector is used to alter the path of ions away from said direction of propagation.

14. An extended Bradbury-Nielson gate according to claim 6 wherein a gate is used to select ions based on mass.

15. A mass selector for use in a time of flight instrument comprising:

a flight tube;

a gate; and an ion source;

wherein said ion source produces ions that travel through said flight tube, wherein said gate impedes the travel of said ions by deflecting said ions into one of two directions, and wherein said gate comprises more than two parallel electrodes in which each of said electrodes has a cross-sectional area which extends in the time of flight direction aligned to deflect substantially all ions away from the direction of ion propagation along said flight tube, and of which at least one of said electrodes is energized.

16. A mass selector according to claim 15 which includes a computer controller.

17. A mass selector according to claim 16 wherein said computer controller includes means to vary voltages applied to said gate.

* * * * *